(12) United States Patent
Kim

(10) Patent No.: US 10,628,041 B2
(45) Date of Patent: Apr. 21, 2020

(54) INTERFACE CIRCUIT AND STORAGE DEVICE HAVING THE INTERFACE CIRCUIT

(71) Applicant: SK hynix Inc., Gyeonggi-do (KR)

(72) Inventor: Soo-Jin Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 22 days.

(21) Appl. No.: 16/141,072

(22) Filed: Sep. 25, 2018

(65) Prior Publication Data
US 2019/0258403 A1 Aug. 22, 2019

(30) Foreign Application Priority Data
Feb. 22, 2018 (KR) ........................ 10-2018-0021024

(51) Int. Cl.
| | |
|---|---|
| G06F 12/10 | (2016.01) |
| G06F 3/06 | (2006.01) |
| G06F 13/38 | (2006.01) |
| G06F 13/12 | (2006.01) |
| G06F 13/16 | (2006.01) |

(52) U.S. Cl.
CPC ............ G06F 3/0604 (2013.01); G06F 12/10 (2013.01); G06F 13/122 (2013.01); G06F 13/1668 (2013.01); G06F 13/385 (2013.01)

(58) Field of Classification Search
CPC .. G06F 12/10; G06F 12/1036; G06F 13/1668; G06F 13/1678; G06F 13/38; G06F 13/385; G06F 13/387
See application file for complete search history.

(56) References Cited

U.S. PATENT DOCUMENTS

| | | | | |
|---|---|---|---|---|
| 8,095,724 B2 * | 1/2012 | Ji | ........................ | C07D 401/12 |
| | | | | 711/103 |
| 9,348,750 B1 * | 5/2016 | Knopp | .................... | G06F 12/04 |
| 2005/0066147 A1 * | 3/2005 | Miller | ................. | G06F 12/1027 |
| | | | | 711/207 |

FOREIGN PATENT DOCUMENTS

| | | |
|---|---|---|
| KR | 101481396 | 1/2015 |
| KR | 1020160093434 | 8/2016 |
| KR | 1020160116594 | 10/2016 |

OTHER PUBLICATIONS

Young-Sik Lee, Sang-Hoon Kim, Jin-Soo Kim, Jaesoo Lee, Chanik Park, and Seungryoul Maeng, OSSD: A Case for Object-based Solid State Drives, 2013 IEEE 29th Symposium on Mass Storage Systems and Technologies (MSST) (pp. 1-13) (Year: 2013).*

* cited by examiner

*Primary Examiner* — Khoa D Doan
(74) *Attorney, Agent, or Firm* — IP & T Group LLP

(57) ABSTRACT

A interface circuit includes an address mapping unit suitable for mapping a plurality of logical master addresses to a logical slave address by using a shifting operation on the respective logical master addresses; an offset setting unit suitable for setting offsets for the respective logical master addresses; and a data controller suitable for accessing a slave to process target data corresponding to the respective logical master addresses based on the logical slave address and the offsets.

20 Claims, 15 Drawing Sheets

FIG. 3B

| Host address | memory address |
|---|---|
| 0x0  0000_0000 | 0x0  0000_0000 |
| 0x8  0000_1000 | |
| 0x10 0001_0000 | |
| 0x18 0001_1000 | |
| 0x20 0010_0000 | 0x10 0001_0000 |
| 0x28 0010_1000 | |
| 0x30 0011_0000 | |
| 0x38 0011_1000 | |
| 0x40 0100_0000 | 0x20 0010_0000 |
| 0x48 0100_1000 | |
| 0x50 0101_0000 | |
| 0x50 0101_1000 | |

FIG. 4B

| Host address | | Offset | memory address |
|---|---|---|---|
| 0x0 | 0000_0000 | 00 | 0x0    0000_0000 |
| 0x8 | 0000_1000 | 01 | |
| 0x10 | 0001_0000 | 10 | |
| 0x18 | 0001_1000 | 11 | |
| 0x20 | 0010_0000 | 00 | 0x10   0001_0000 |
| 0x28 | 0010_1000 | 01 | |
| 0x30 | 0011_0000 | 10 | |
| 0x38 | 0011_1000 | 11 | |
| 0x40 | 0100_0000 | 00 | 0x20   0010_0000 |
| 0x48 | 0100_1000 | 01 | |
| 0x50 | 0101_0000 | 10 | |
| 0x50 | 0101_1000 | 11 | |

INTERFACE CIRCUIT AND STORAGE DEVICE HAVING THE INTERFACE CIRCUIT

CROSS-REFERENCE TO RELATED APPLICATIONS

The present application claims priority under 35 U.S.C. § 119(a) to Korean Patent Application No. 10-2018-0021024 filed on Feb. 22, 2018, the disclosure of which is incorporated herein by reference in its entirety.

BACKGROUND

1. Field

Various exemplary embodiments of the present invention relate generally to an interface circuit in a memory system. Particularly, exemplary embodiments relate to an interface circuit capable of efficiently managing data, and an operating method thereof.

2. Description of the Related Art

The paradigm for computing environments moves toward ubiquitous computing which provides people or users the capability to use their or commonly supplied computing systems anytime, anywhere. In the era of ubiquitous computing, the demand for portable electronic devices, such as mobile phones, digital cameras and laptop computers is soaring. Those electronic devices generally include a memory system using a memory device as a data storage device. The data storage device may be used as a main memory unit or an auxiliary memory unit of a portable electronic device.

Since the data storage device is using a memory device which does not have a mechanical driving unit (e.g., a mechanical arm with a read/write head) as compared with a hard disk device, it exhibits excellent stability and durability. Also, the data storage device can have a quicker data access rate with lower power consumption than a hard disk device. Non-limiting examples of the data storage device having such advantages include Universal Serial Bus (USB) memory devices, memory cards of diverse interfaces, Solid-State Drives (SSD) and the like.

SUMMARY

Various embodiments of the present invention are directed to an interface circuit capable of interfacing to perform efficiently a read operation or write operation by setting an offset value corresponding to a master address, after synchronizing the master address with a slave address.

In accordance with an embodiment of the present invention, an interface circuit may include: an address mapping unit suitable for mapping a plurality of logical master addresses to a logical slave address by using a shifting operation on the respective logical master addresses; an offset setting unit suitable for setting offsets for the respective logical master addresses; and a data controller suitable for accessing a slave to process target data corresponding to the respective logical master addresses based on the logical slave address and the offsets.

In accordance with an embodiment of the present invention, an operating method of an interface circuit may include: mapping a plurality of logical master addresses to a logical slave address by using a shifting operation on the respective logical master addresses; setting offsets for the respective logical master addresses; and accessing a slave to process target data corresponding to the respective logical master addresses based on the logical slave address and the offsets.

The setting of the offsets may include setting a start offset and an end offset, wherein the start offset is an offset of a first address of the logical master addresses corresponding to the target data, and the end offset is an offset of a last address of the logical master addresses corresponding to the target data.

The operating method of an interface circuit may further include determining an order of a plurality of commands corresponding to the target data.

The determining of the order of the commands may include: checking a boundary of an address at which only corresponding row is changed; and determining the order of the plurality of commands based on the boundary of the address.

The accessing of the target data may include outputting data stored in the slave to a master based on the mapped addresses and the offsets.

The accessing of the target data may further include outputting data transferred from a host to the slave based on the mapped addresses and the offsets.

The outputting of the data to the slave may include: reading candidate data allocated to the logical slave address corresponding to each of the start offset and the end offset; and merging the outputted data with the candidate data to output to the slave.

The accessing of the target data may further include checking whether or not the slave has a data masking function.

The operating method of an interface circuit may further include outputting the data to be written to the slave based on the data masking function when the slave has the data masking function.

The accessing of the target data further may include: checking whether or not the data to be written is aligned data; and outputting the data to be written to the slave based on a result of the checking of the data.

In accordance with an embodiment of the present invention, a storage device may include an interface circuit for interfacing a master to a slave, the interface circuit being suitable for: mapping a plurality of logical master addresses to a logical slave address; setting offsets for the respective logical master addresses; and accessing the slave to process target data corresponding to the respective logical master addresses based on the logical slave address and the offsets.

These and other features and advantages of the present invention will become apparent from the following description with reference to the following figures.

BRIEF DESCRIPTION OF THE DRAWINGS

The description herein refers to the accompanying drawings wherein like reference numerals refer to like parts throughout the several views, and wherein:

FIG. 3B is a diagram schematically illustrating an address mapping table in accordance with an example of the disclosure;

FIG. 4B is a diagram schematically illustrating an address mapping table including offsets set to correspond to the host addresses in accordance with an example of the disclosure;

DETAILED DESCRIPTION

Figure 1:
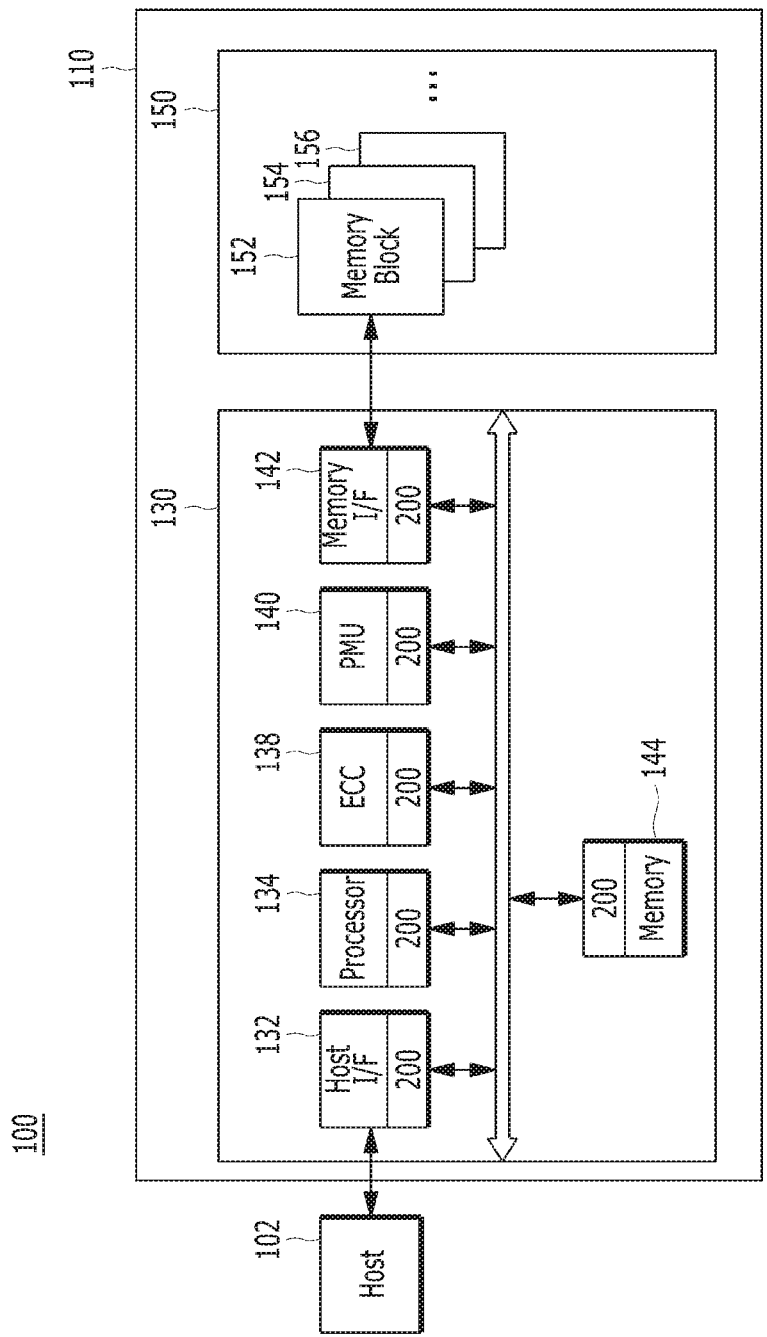
FIG. 1 is a block diagram illustrating a data processing system including a memory system in accordance with an example of the disclosure.

Various examples of the disclosure are described below in more detail with reference to the accompanying drawings. It is noted, however, that the disclosure may be embodied in different other embodiments, forms and variations thereof and should not be construed as being limited only to the embodiments set forth herein. Rather, the described embodiments are provided as examples so that this disclosure will be thorough and complete, and will fully convey the disclosure to those skilled in the art to which this invention pertains.

Also, it will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily drawn to scale and, in some instances, proportions may have been exaggerated in order to clearly illustrate the various features of the embodiments. Furthermore, when an element is referred to as being connected or coupled to another element, it should be understood that the former can be directly connected or coupled to the latter, or connected or coupled to the latter via an intervening element therebetween. The connection may be a mechanical and/or an electrical connection as the case may be.

In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, are open ended terms that specify the presence of any stated elements but do not preclude the presence or addition of one or more other elements. As used herein, the term "A and/or B" has the same meaning as the expression of "at least one of A and B" or "at least one of A or B" and includes any and all combinations of one or more of the associated listed items, e.g., the A and B.

Unless otherwise defined, all terms including technical and scientific terms used herein are intended to have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

We also note that in the following description, numerous specific details are set forth in order to provide a thorough understanding of the present invention. However, it should be understood that the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the plurality of pages may include a plurality of memory cells to which a plurality of word lines (WL) are electrically coupled.

The controller 130 may control overall operations of the memory device 150, such as read, write, program and erase operations. The controller 130 of the memory system 110 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) 132, a processor 134, an error correction code (ECC) unit 138, a power management unit (PMU) 140, a memory interface (I/F) 142, a memory 144.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (DATA), small computer system interface (SCSI), enhanced small disk interface (ESDI) and integrated drive electronics (IDE).

The ECC unit 138 may detect and correct errors in the data read from the memory device 150 during the read operation. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may provide and manage power of the controller 130.

The memory interface 142 may serve as an interface for handling commands and data transferred between the controller 130 and the memory device 150, so as to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory of the memory system 110 and the controller 130, and may store temporary or transactional data for operating or driving the memory system 110 and the controller 130. The controller 130 may control the memory device 150 in response to a request from the host 102. The controller 130 may deliver data read from the memory device 150 into the host 102, may store data entered through the host 102 within the memory device 150. The memory 144 may be used to store data required for the controller 130 and the memory device 150 in order to perform these operations.

The memory 144 may be implemented with a volatile memory. The memory 144 may be implemented with a static random-access memory (SRAM) or a dynamic random-access memory (DRAM). Although FIG. 1 exemplifies the memory 144 disposed within the controller 130, the disclosure is not limited thereto. That is, the memory 144 may be located inside or outside the controller 130. For instance, the memory 144 may be embodied by an external volatile memory having a memory interface transferring data and/or signals transferred between the memory 144 and the controller 130.

The processor 134 may control the overall operations of the memory system 110. The processor 134 may drive or execute a firmware to control the overall operations of the memory system 110. The firmware may be referred to as a flash translation layer (FTL).

An FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data on another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 100, and thus reliable bad block management is required.

Each of the components of the controller 130 may be electrically coupled to, or operatively engaged with, each other via an internal bus. The internal bus may be divided into a data bus, an address bus and a control bus. The data bus may provide a data path between components of the system. The address bus may transfer a source of data or a constant address of a destination, and the control bus may be used to control the data bus and the address bus. A configuration of the bus may be an advanced microcontroller bus architecture (AMBA). Further, the AMBA may include a plurality of kinds of protocols such as an advanced peripheral bus (APB), an advanced extensible interface (AXI), an advanced high-performance bus (AHB) and an advanced system bus (ASB). Hereinafter, for convenience in description, it is assumed that the structure of the bus included in the controller 130 according to an embodiment of the present invention is the AMBA.

Referring to FIG. 1, as described above, each of the components of the controller may include an interface circuit 200 according to the bus protocol such as the AMBA. For example, when a master and a slave operating according to a command of the master exist, a first reference by which the master accesses address and data and a second reference by which the slave accesses address and data may be different from each other. For convenience in description, it is assumed that the master is a host, and the slave is a memory.

The host may access data in units of bytes that are set in advance, and an address of the host may be configured based thereon. For example, when the host processes the data in units of 8 bytes, the address of the host may be '0x0, 0x8, 0x10, 0x18 . . . '. Further, the data may be allocated to the address by 8 bytes, and the host may access an 8-byte data chunk at a time. On the other hand, assuming that the memory of the controller is an LPDDR4 DRAM, a unit for data access may vary depending on data bus (DQ) and burst length (BL) of the DRAM. For example, when the DRAM operates at a mode in which the DQ is 'x16' and the BL is '16', the address of the memory may be '0x0, 0x10, 0x20, 0x30', and since the BL is '16', the data band width may be incremented by a unit of '16'. Furthermore, since the DQ is 'x16', a 32-byte data chunk may be accessed at a time. Thus, as described above, the address and data access references of the host and the memory may be different from each other. If the addresses and data are not aligned, the controller may perform an operation that the host does not request, unnecessarily access the memory, and use an unnecessary storage space, whereby overall performance of the system is degraded. Accordingly, in order to resolve such a concern, there is a need for an interface circuit capable of mapping, i.e., synchronizing the address and data access references of the host and the memory. Hereinafter, for convenience in description, it is assumed that the addresses of the host and memory represent logical addresses.

Hereinafter, an interface circuit capable of synchronizing the address and data access references of the master and the slave is described. For convenience in description, it is assumed that the master is the host 102 and the slave is the memory 144. That is, it is assumed that the interface circuit according to an embodiment of the present invention is embedded in the memory 144. This is merely an example for convenience in description, and the present invention is not limited to the example. Further, for convenience in description, it is assumed that the host 102 processes data in units of 8 bytes, the memory 144 is LPDDR4 operating at a mode in which the DQ is 'x16' and the BL is '16'. In addition, it is assumed that the memory 144 is proceeded with four clocks when the controller 130 is proceeded with one clock. That is, it is assumed that a frequency ratio between the controller 130 and the memory 144 is '1:4'. This is merely an example, and the present invention is not limited thereto.

Figure 2:
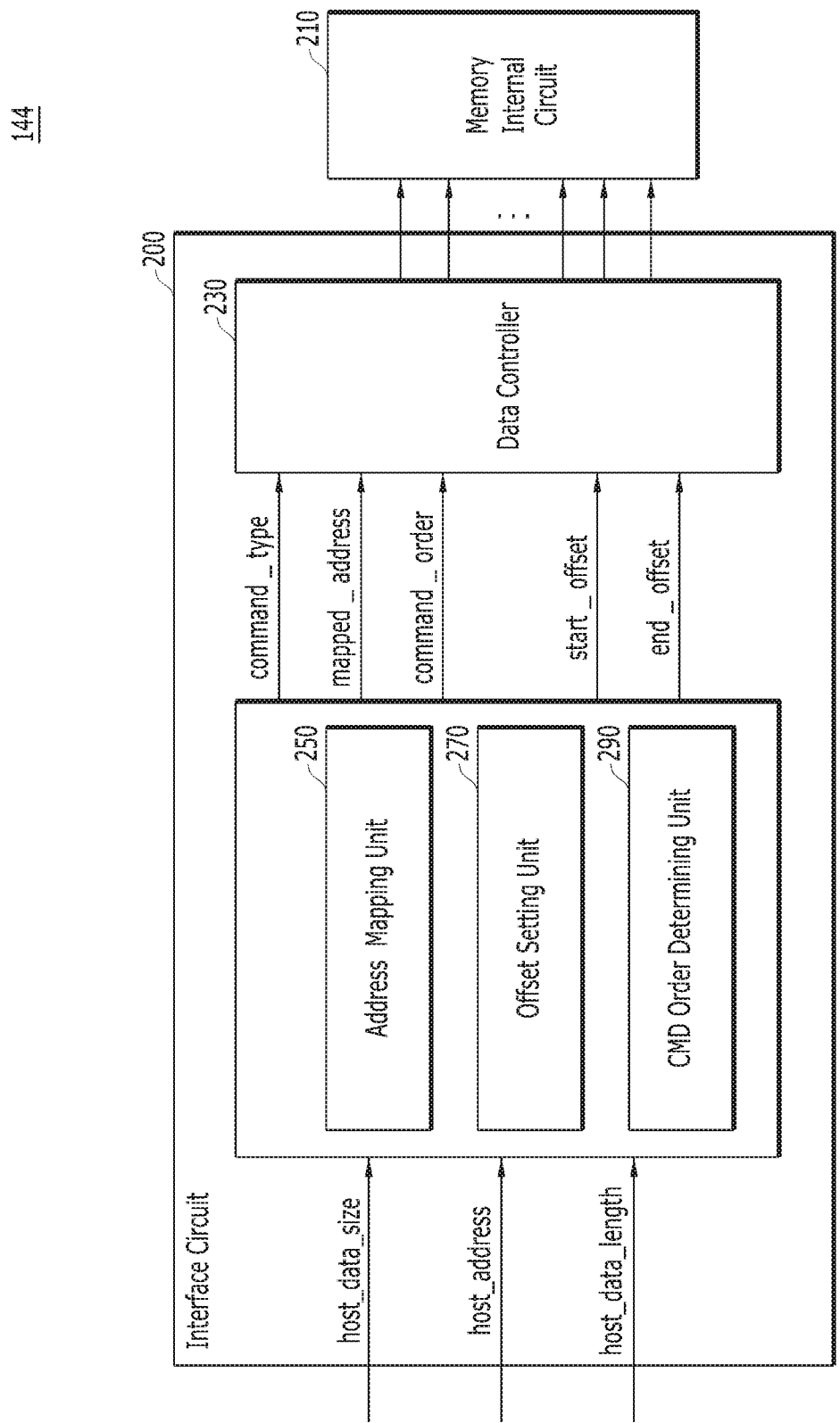
FIG. 2 is a block diagram schematically illustrating a configuration of the interface circuit and a configuration of the memory including the interface circuit in accordance with an example of the disclosure.

FIG. 2 is a block diagram schematically illustrating a configuration of the interface circuit 200 and a configuration of the memory 144 including the interface circuit 200. The memory 144 may include the interface circuit 200 and a memory internal circuit 210. Although not illustrated, the memory internal circuit 210 may include a memory controller capable of processing data transmitted from the interface circuit 200. The memory 144 is merely an example, a relationship between the mask and the slave is not limited to the memory 144 and the interface circuit 200.

The interface circuit 200 may include a data controller 230, an address mapping unit 250, an offset setting unit 270, and a command (CMD) order determining unit 290. The interface circuit 200 may externally receive a host address, a burst length of the host address, and information on a size of data allocated to the host address through the bus. For example, when the host address is '0x0', the burst length of the host address is '3', and the size of the allocated data is '3', the interface circuit 200 may receive host addresses '0x0, 0x8, 0x10, 0x18' because the burst length of the host address is '3', and 8-byte data, which is a cube of 2-byte ($2^3$), may be allocated to each of the host addresses.

The address mapping unit 250 may map a plurality of host addresses to a memory address. Specifically, the address mapping unit 250 may generate a many-to-one corresponding relationship between the plurality of host addresses and the memory address. For example, the address mapping unit 250 may map the host addresses '0x0, 0x8, 0x10, 0x18' to the memory address '0x0'. In the same manner, the address mapping unit 250 may map host addresses '0x20, 0x28, 0x30, 0x38' to a memory address '0x10'. In other words, four host addresses may correspond to one memory address. This is because 32-byte data is allocated to one memory address while 8-byte data is allocated to one host address. A detailed mapping method is described with reference to FIGS. 3A and 3B.

The offset setting unit 270 may set offsets to the respective host addresses. For example, the host addresses '0x0, 0x8, 0x10, 0x18' assigned to the memory address '0x0' may be sequentially set to offsets '00, 01, 10, 11'. Accordingly, an address having the offset '01' of the memory address '0x0' is the host address '0x8'. When a read operation or a write operation is performed, the controller 130 may designate a range of data, which is a target for the read operation or the write operation, based on the offsets. A detail method of setting the offsets is described with reference to FIGS. 4A and 4B.

When there are a plurality of commands for the same target data, the command order determining unit 290 may determine an order of executing the commands.

For example, the host 102 may issue a write command for the target data stored in the memory 144. If a memory region corresponding to an address to which the target data is to be written is empty, the memory 144 may well perform the write operation corresponding to the write command. On the other hand, if the memory region (i.e., the one corresponding to an address to which the target data is to be written) already stores data, the memory 144 may read data which are already stored in the memory region, and also write the new data corresponding to the write command in the memory region. In other words, the host 102 may issue a read command in addition to the write command to the memory 144 for the same memory region in which case the memory 144 may sequentially process the operations corresponding to the read command and the write command. The command order determining unit 290 may determine an order of performing the operations corresponding to the read and write commands. This is merely an example, and the present invention is not limited thereto. The command order determining unit 290 is described in detail with reference to FIG. 5.

The data controller 230 may process the target data based on information received from the address mapping unit 250, the offset setting unit 270, and the CMD order determining unit 290. The information may be, for example, information relating to a type of the command "command_type", a mapped address "mapped_address", set offsets (such as "start_offset" and "end_offset") and a determined order of memory commands "command_order". The data controller 230 is described in detail with reference to FIGS. 6 and 7.

Figure 3A:
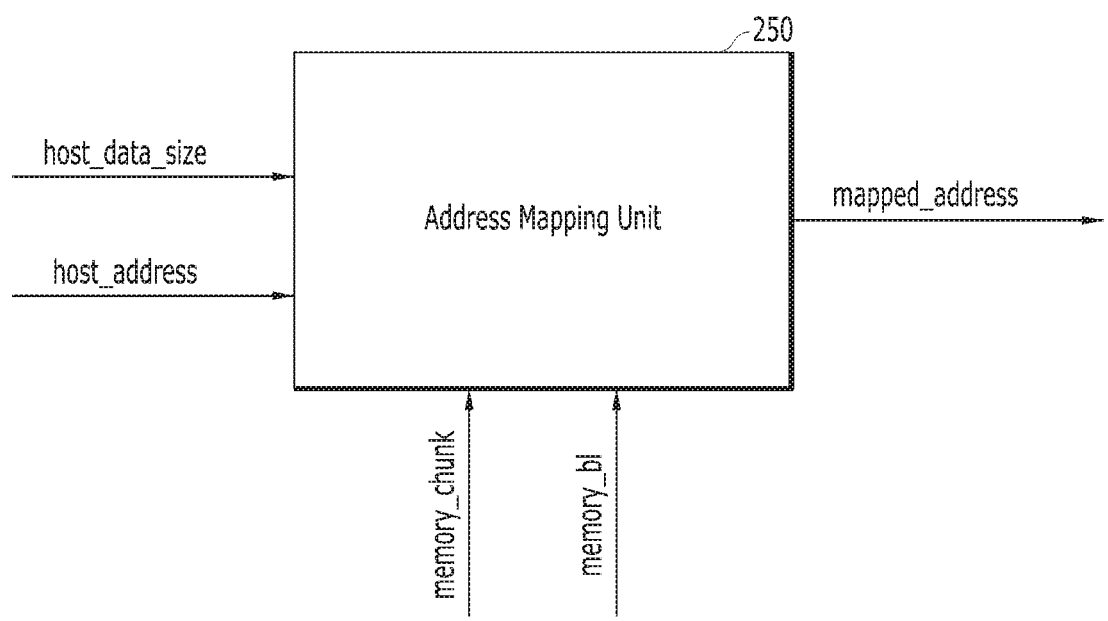
FIG. 3A is a diagram schematically illustrating an address mapping unit in accordance with an example of the disclosure.

FIG. 3A is a diagram schematically illustrating an address mapping unit 250 in accordance with an embodiment of the present invention. Specifically, FIG. 3A schematically illustrates the elements used for a calculation process (or calculation processes) for mapping a host address to a memory address.

As described above, the address mapping unit 250 may generate a corresponding relationship between the host address and the memory address. The address mapping unit 250 may check configurations of a host address "host_address" through a size of data "host_data_size" that the host 102 may process at a time. For example, when the size of data "host_data_size" that the host 102 may process at a time is 8 bytes, the host address "host_address" of the host 102 may be composed of '0x0, 0x8, 0x10, 0x18, 0x20'. After checking the configurations of the host address, the address mapping unit 250 may use a size of data that the memory 144 may process at a time (hereinafter referred to as a memory chunk "memory_chunk") and a burst length "memory . . . bl" of the memory 144 to generate the corresponding relationship between the host address and the memory address. For example, when the memory chunk "memory_chunk" is 32 bytes, the address mapping unit 250 may correspond one memory address to four host addresses since the size of the data allocated to one host address is 8 bytes. For another example, the address mapping unit 250 may calculate the memory address by shifting by a logarithm with base 2 of a value of the memory chunk "memory_chunk" to the right in the host address and then by shifting by a logarithm with base 2 of a value of the memory burst length "memory_bl" to the left. Specifically, when the host address '0x10' is represented by a logical address of '0001_0000', the address mapping unit 250 may shift the memory address to the right by 5, which is a logarithm with base 2 of '32'. In this case, only '000' is left, and the address mapping unit 250 may obtain '000_0000' by shifting the calculated value to the left by 4, which is a logarithm with base 2 of '16'. Thereafter, the address mapping unit 250 may perform a zero-padding operation on a leading edge thereof, and finally may obtain the memory address as '0000_0000', that is, 0x0'. Therefore, the host address '0x10' and the memory address '0x0' may be mapped. This is merely an example, and the present invention is not limited thereto.

The address mapping unit 250 may output the mapped address "mapped_address" calculated as above.

FIG. 3B is a diagram schematically illustrating an address mapping table.

Referring to FIG. 3B, four host addresses may correspond to one memory address. As described above, since the size of the data allocated to one host address is 8 bytes, total 32-byte data may be allocated to the four host addresses and be the same as a size of data allocated to the one memory address. Referring to such a calculation using a shifting operation described above, since only left three digits remain in the logical value of the host address, the corresponding relationship represented in FIG. 3B may be generated. This is merely an example, and other corresponding relationships may be generated by differentiating specifications of the host 102 or the memory 144.

Figure 4A:
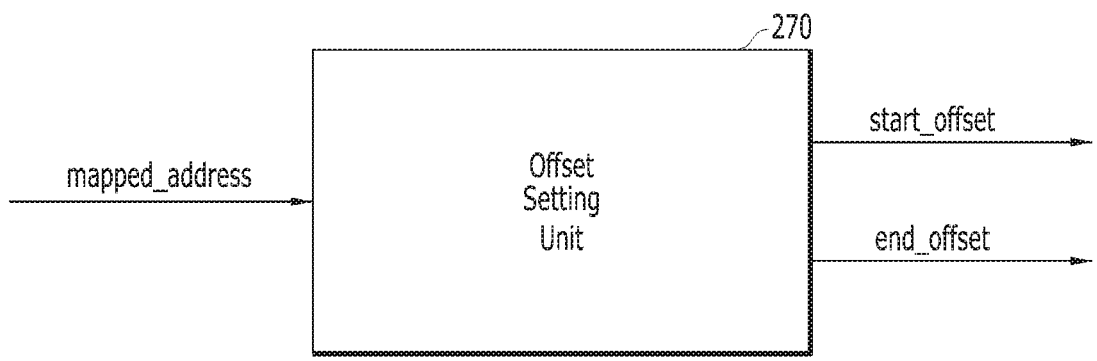
FIG. 4A is a diagram schematically illustrating an offset setting unit in accordance with an example of the disclosure.

FIG. 4A is a diagram schematically illustrating an offset setting unit 270 in accordance with an embodiment of the present invention. Specifically, FIG. 4A is a diagram schematically illustrating constituent elements required for setting the offsets.

In case where the example described above is applied, the offset setting unit 270 may set the offset for each of the four host addresses to the one memory address. Specifically, since the host addresses and the memory address are mapped as above, the offset setting unit 270 may determine the number of the offsets. Referring to FIGS. 3A and 3B, since the four host addresses correspond to the one memory address, the offset setting unit 270 may set four offsets for distinguishing each of the four host addresses. For example, the offset setting unit 270 may set the offsets for the host addresses '0x0, 0x8, 0x10, 0x18' corresponding to the memory address '0x0', as '00, 01, 10, 11', respectively. Particularly, the controller 130 may set a range of data to be read or written based on the set offsets. That is, the offset setting unit 270 may set an offset "start_offset" of a first host address to which the target data is allocated and an offset "end_offset" of a last host address to which the target data is allocated. Specifically, the offset "start_offset" may be set based on the host address, and the offset "end offset" may be set based on the host address and a length of the target data. For example, when the host 102 reads target data having the length '7' starting from the host address '0x8', the host 102 may read data corresponding to a total of eight host addresses ranging from the host address '0x8' to the host address '0x40'. In this case, the offset "start_offset" of the first host address is '01' corresponding to '0x8', and the offset "end_offset" of the last host address is '00' corresponding to '0x40'. The controller 130 may read or write the target data to be processed based on the offsets set as described above.

FIG. 4B is a diagram schematically illustrating an address mapping table including the offsets that are set to correspond to the host addresses in accordance with an embodiment of the present invention.

As described above, the offset setting unit 270 may set the offsets to correspond to each of the host addresses.

Figure 5:
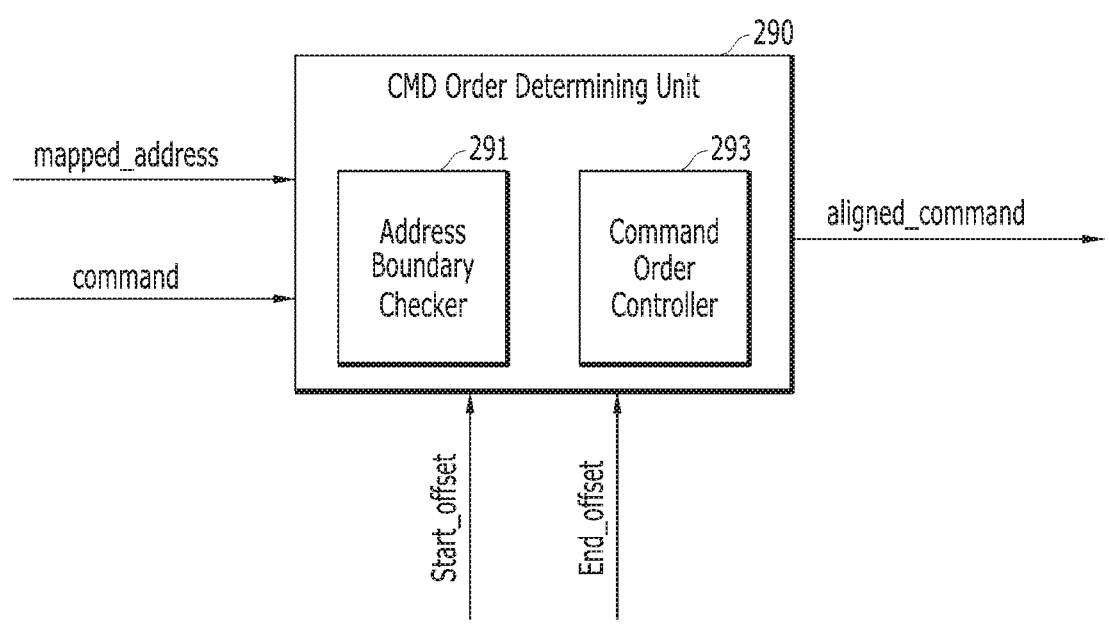
FIG. 5 is a diagram schematically illustrating a command order determining unit in accordance with an example of the disclosure.

FIG. 5 is a diagram schematically illustrating a command order determining unit 290 in accordance with an embodiment of the present invention.

The command order determining unit 290 may include an address boundary checker 291 and a command order controller 293. As described above, the command order determining unit 290 may determine a processing order of operations corresponding to a plurality of memory commands corresponding to host commands.

The address boundary checker 291 may check a boundary of an address, at which only a corresponding row is changed, so that the data controller 230 may perform the read operation or the write operation on the same row.

The memory address may be divided according to a channel, a rank, a bank, a row and a column. In order to perform the read operation or the write operation corresponding to a read host command or a write host command issued from the host 102, the memory 144 may activate a row corresponding to the memory address and then perform the read or write operation on a memory region corresponding to the memory address. In case where it is determined that a row is changed by comparing a current memory address with a previous memory address for the read or write operation, the host 102 may transmit a precharge command for a row corresponding to the previous memory address to the memory 144 to deactivate the corresponding row, and transmit an active command for a row corresponding to the current memory address to activate the corresponding row. That is, the read or write commands may be continuously executed according to the rows corresponding to the memory addresses, and an additional command such as a precharge command and an active command may be required. However, when the precharge and active commands are required, a delay of the entire system due to a processing operation for the additional command may occur. Therefore, the address boundary checker 291 may check the address boundary to process the read or write operation for the same row at a time in order to minimize the delay.

Further, the command order controller 293 may determine the processing order for the plurality of commands so as to process the read or write operation for the same row at a time in order to minimize the delay. For example, when one row is fully needed to write data, the command order controller 293 may determine the command order so that a write command may be processed after the command for changing a row is processed to utilize a new row rather than a row in which data is partially stored. However, this is merely one embodiment, but is not limited thereto.

Figure 6:
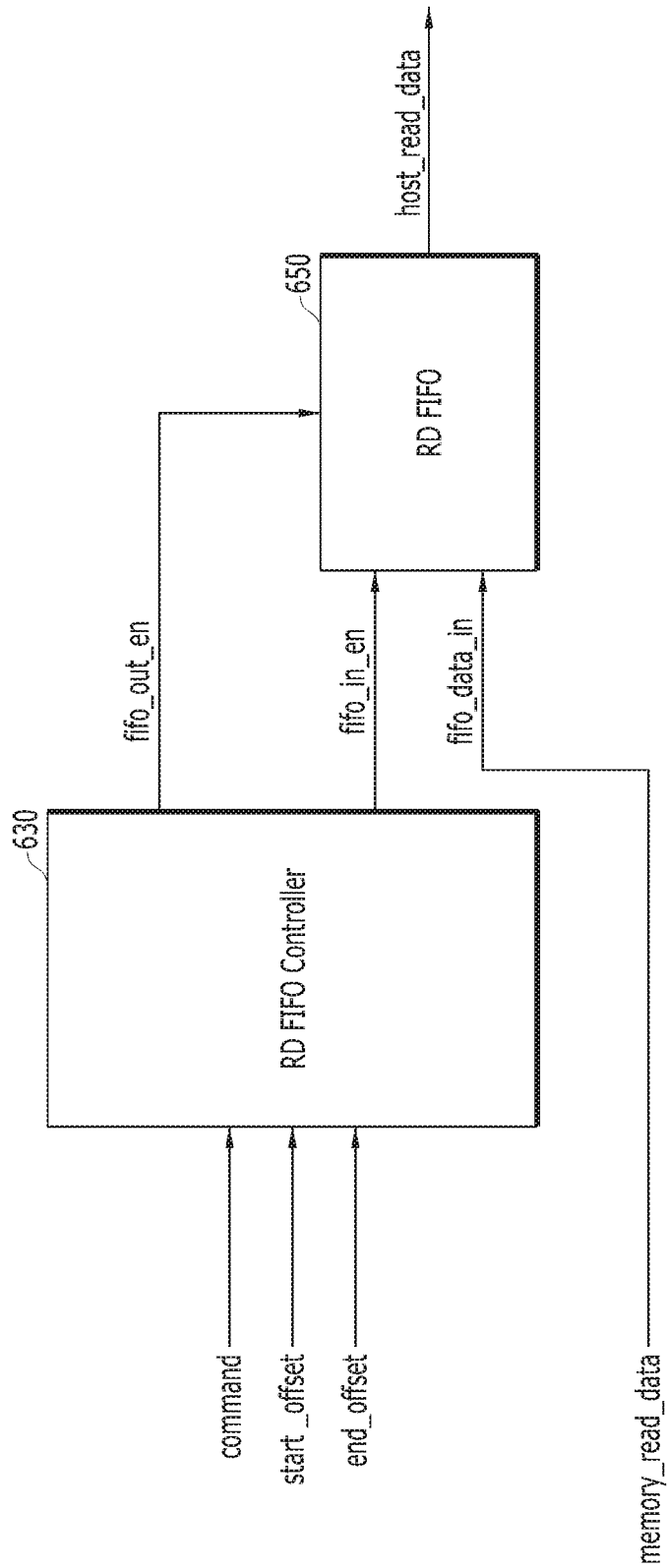
FIG. 6 is a diagram schematically illustrating a configuration of the data controller in accordance with an example of the disclosure.

FIG. 6 is a diagram schematically illustrating a configuration of a data controller 230 in accordance with an embodiment of the present invention. Specifically, FIG. 6 schematically illustrates a configuration of the data controller 230 capable of performing the read operation in case where the host 102 issues the read host command.

The data controller 230 may include a read (RD) FIFO controller 630 and a read (RD) FIFO 650. The read FIFO controller 630 may control the read FIFO 650, and the read FIFO 650 may temporarily store the target data of the data stored in the memory 144.

When the host 102 issues the read command corresponding to the target data, the read FIFO controller 630 may control the read FIFO 650 to store the target data based on the type of commands "command_type", the mapped address "mapped_address" and the set offsets (i.e., the start offset "start_offset" and the last offset "end offset" of the target data).

Specifically, the read FIFO controller 630 may transmit a signal "fifo_in_en" that enables the target data "memory_read_data" stored in the memory 144 to be stored into the read FIFO 650 to the read FIFO 650. Based on the signal "fifo_n_en", the target data "memory_read_data" stored in the memory 144 is read and stored in the read FIFO 650 (see "fifo_data_in"). Subsequently, the read FIFO controller 630 may transmit a signal "fifo_out_en" that enables the data stored in the read FIFO 650 to be outputted to the host 102, and hence the target data host_read_data may be outputted from the read FIFO 650 to the host 102.

In this case, since the read FIFO controller 630 controls the read FIFO 650 to store just the target data based on the offsets, the read FIFO controller 630 may control less storage space of the read FIFO 650 than when the offsets are not utilized.

Referring to FIGS. 3B and 4B, it is assumed that the host 102 issues the command to read data ranging from the host address '0x18' to the host address '0x50'.

When the offsets are not utilized, the read FIFO controller 630 may control the read FIFO 650 to store all data ranging from the host address '0x0' to the host address '0x58'. Subsequently, the read FIFO controller 630 may control the read FIFO 650 to output the data ranging from the host address '0x18' to the host address '0x50' which are substantially required in response to the signal "fifo_out_en". In other words, the data corresponding to the host addresses '0x0, 0x8, 0x10, 0x58' which are not substantially required may be temporarily stored in the read FIFO 650.

However, when the offsets are utilized, the read FIFO controller 630 may control the read FIFO 650 to store the data corresponding to the host addresses 0x18 to 0x50 which are substantially required. Accordingly, the storage space of the read FIFO 650 may be efficiently managed.

Figure 7:
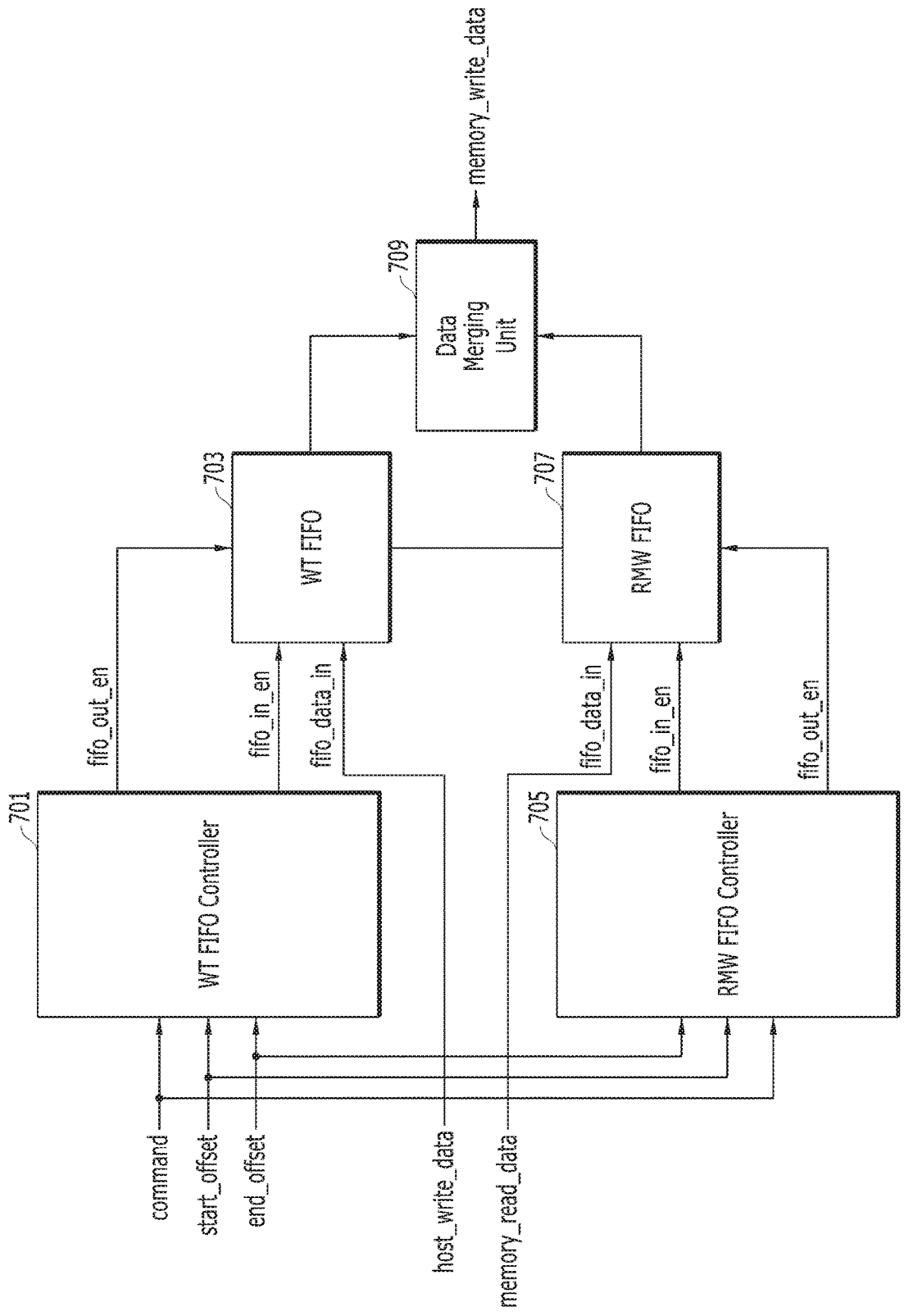
FIG. 7 is a diagram schematically illustrating a configuration of the data controller in accordance with an example of the disclosure.

FIG. 7 is a diagram schematically illustrating a configuration of the data controller 230 in accordance with an embodiment of the present invention. Specifically, FIG. 7 schematically illustrates a configuration of the data controller 230 capable of performing the write operation in case where the host 102 issues the write command. For convenience in description, referring to FIGS. 3B and 4B, it is assumed that the host 102 issues the command to write data ranging from the host address '0x18' to the host address '0x50'.

The data controller 230 may include a write (WT) FIFO controller 701, a write (WT) FIFO 703, an RMW FIFO controller 705, an RMW FIFO 707, and a data merging unit 709. The RMW FIFO controller 705 and the RMW FIFO 707 may correspond to the read FIFO controller 630 and the read FIFO 650, respectively, described above with reference to FIG. 6.

The data controller 230 may check whether or not the memory 144 has a data masking function. The data masking function is performed in units of bytes, and requires write data and data masking information. The data masking information may be represented for each byte position of the write data. For example, when it is assumed that the write operation is performed on 4-byte data of '0x12345678', '0x12345678' may be written to the memory 144 if the data masking information is '0x1111'. On the other hand, if the data masking information is '0x1110', '0x12345678' may be written as '0x123456xx' to the memory 144. That is, a least significant one byte of data may not be written to the memory 144.

If the memory 144 does not have the data masking function, the write FIFO controller 701 may generate a signal "fifo_in_en" that enables to temporarily store target data in the write FIFO 703 based on the mapped address and the offsets. The target data host_write_data may be temporarily stored in the write FIFO 703 in response to the signal "fifo_in_en". Thereafter, before the data is written to the memory 144, the RMW FIFO controller 705 may read candidate data "memory_read_data" stored in the memory 144. In the same manner as an operation principle of the read FIFO controller 630 described with reference to FIG. 6, the RMW FIFO controller 705 may control the RMW FIFO 707 to temporarily store the candidate data. Subsequently, the write FIFO controller 701 and the RMW FIFO controller 705 may control the write FIFO 703 and the RMW FIFO 707 to output the data stored in each of the write FIFO 703 and the RMW FIFO 707. Thereafter, the data merging unit 709 may merge the data outputted from the write FIFO 703 and the RMW FIFO 707. That is, the data merging unit 709 may update the data corresponding to the write command and the candidate data stored in the memory 144 with new data. The data controller 230 may output the merged and updated data to the memory 144. As described in FIG. 6, since the write operation is performed based on the offsets, the storage space of the write FIFO 703 or the RMW FIFO 707 may be efficiently managed.

For convenience in description, it is assumed that data '1234' is stored in a memory address '0x0', data '5678' is stored in a memory address '0x10', and data 'abcd' is stored in memory address '0x20', and the host 102 issues a command to write data '3456788a' ranging from a host address '0x18' to a host address '0x50'. Each character represents 8-byte data. Therefore, 32-byte data may be allocated to one memory address composed of total 4 characters. In the same manner, 8-byte data may be assigned to one host address composed of a total one character. The host addresses and the memory address may be mapped as shown in FIG. 3B, and the offsets corresponding to the host addresses may be set as shown in FIG. 4B.

The write FIFO controller 701 may control the write FIFO 703 to store the write data '3456788a' in response to the write command. Subsequently, the RMW FIFO controller 705 may check a start offset "start_offset" and a last offset "end_offset" of the target data. Since the start offset "start_offset" of the target data is '11' of the memory address '0x0', the RMW FIFO controller 705 may control the RMW FIFO 707 to read the data '1234' stored in a memory region corresponding to the memory address '0x0'. Since the last offset "end_offset" of the target data is '10' of the memory address '0x20', the RMW FIFO controller 705 may control the RMW FIFO 707 to read the data 'abcd' stored in a memory region corresponding to the memory address '0x20'. Here, the reason why the data '5678' corresponding to the memory address '0x10' is not read is that the write data may be written to all the memory region corresponding to the memory address '0x10'. This is possible by assuming that the memory 144 is a DRAM, and if a type of the memory 144 is different, the operation may be different from the above. The write FIFO controller 701 and the RMW FIFO controller 705 may control the write FIFO 703 and the RMW FIFO 707 to output the corresponding data, respectively. The data merging unit 709 may merge the outputted data. Specifically, the data merging unit 709 may merge the data '1234' assigned to the memory address '0x0' and the data '3' assigned to the host address '0x18' to generate data '1233'. In addition, the data merging unit 709 may merge the data 'abcd' assigned to the memory address '0x20' and the data '88a' assigned to the host addresses '0x40, 0x48, 0x50' to generate data '88ad'. Consequently, the data merging unit 709 may output data '1233567888ad'.

On the other hand, when the memory 144 has the data masking function, the data controller 230 may not perform a preceding read operation ahead of the write operation. In other words, the data controller 230 may write just the target data without reading the data stored previously based on the masking information.

In addition, the data controller 230 may check whether or not the write data is aligned data. The aligned data refers to data that may accurately mapped between the host addresses and the memory address. Referring to FIG. 4B, for example, when write data is allocated from the host address '0x0' to '0x58', the write data is the aligned data since it is accurately mapped from the memory address '0x0' to '0x20'. On the other hand, when the write data is allocated from the host address '0x18' to '0x40', the write data is not the aligned data since it is mapped from the offset '11' of the memory address '0x0' to the offset '00' of the memory address '0x20'. Accordingly, when the write data is the aligned data, the preceding read operation may not be performed.

Figure 8:
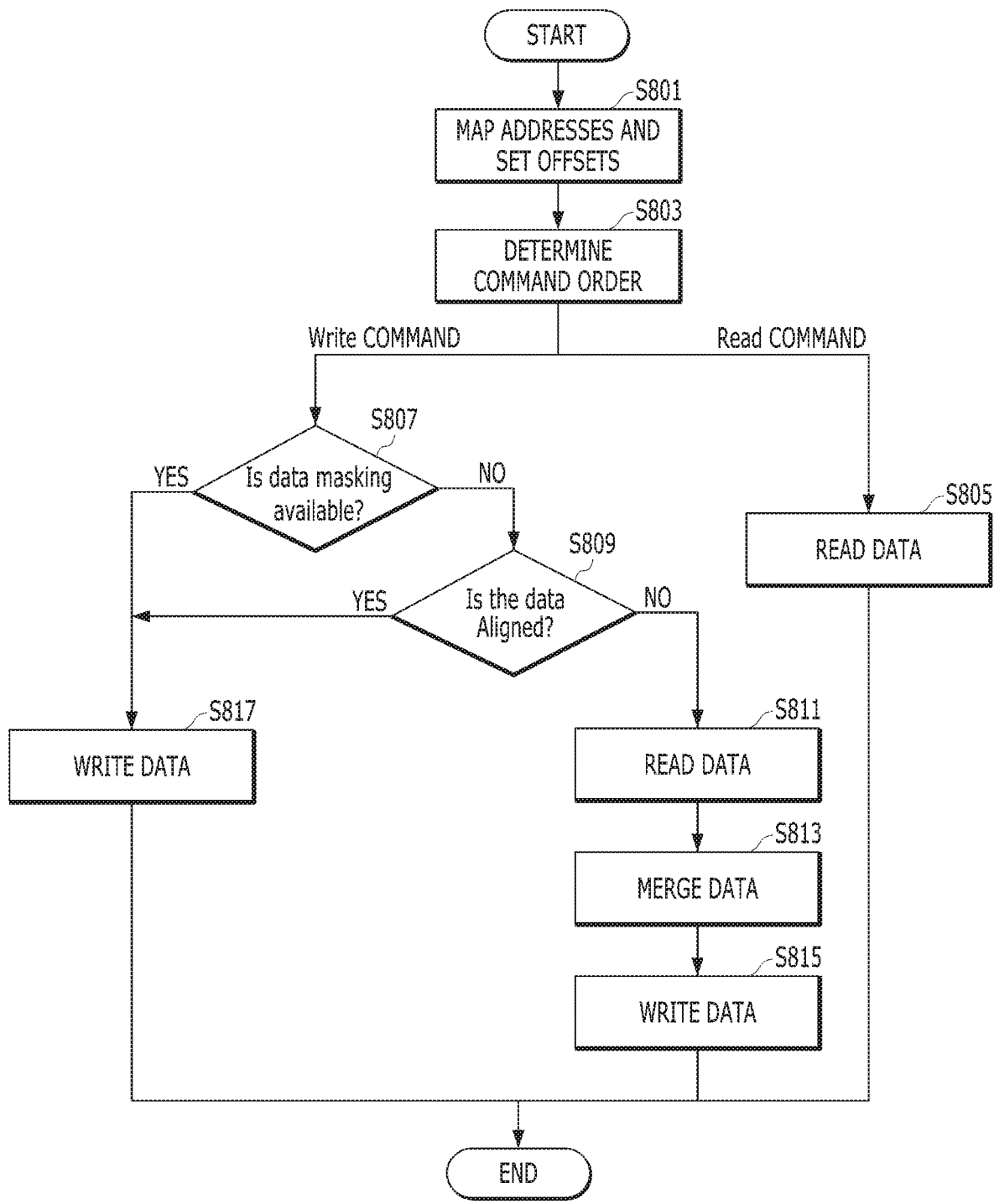
FIG. 8 is a flowchart schematically illustrating an operation of the interface circuit in accordance with an example of the disclosure.

FIG. 8 is a flowchart schematically illustrating an operation of the interface circuit 200 in accordance with an embodiment of the present invention.

In step S801, the address mapping unit 250 may generate a corresponding relationship between the host addresses and the memory address to map the addresses as described above with reference to FIGS. 3A and 3B. In addition, the offset setting unit 270 may set the offsets corresponding to the host addresses as described above with reference to FIGS. 4A and 4B.

In step S803, when there are a plurality of commands as described above with reference to FIG. 5, the command order determining unit 290 may determine an order of the commands.

When the read data is the target data to be processed, the data controller 230 may control the memory 144 to read the data as described above with reference to FIG. 6, in step S805. In addition, the data controller 230 may output the read data to the host 102.

On the other hand, when the write data is the target data to be processed, the data controller 230 may check whether or not the memory 144 has the data masking function in step S807.

When the memory 144 has the data masking function (that is, "YES" in step S807), the data controller 230 may control the memory 144 to write the write data to the memory 144 in step S817. Specifically, the data controller 230 may output the write data to the memory internal circuit 210, and the memory internal circuit 210 may store the outputted data.

When the memory 144 does not have the data masking function (that is, "NO" in step S807), the data controller 230 may check whether or not the write data is the aligned data with reference to FIG. 7 in step S809.

When the write data is not the aligned data (that is, "NO" in step S809), the data controller 230 may perform a preceding read operation for reading the data stored in the memory 144 as described with reference to FIG. 7, in step S811.

The data controller 230 may merge the write data with the data read from the memory 144 in step S813.

The data controller 230 may control the memory 144 to write the merged data to the memory 144 in step S815. Specifically, the data controller 230 may output the merged data to the memory internal circuit 210, and the memory internal circuit 210 may store the outputted data.

When the write data is the aligned data (that is, "YES" in step S809), the data controller 230 may control the memory 144 to write the write data to the memory 144 without preceding the read operation, in step S817.

Since the address and data access references of the master and the slave are different, a corresponding relationship is generated and mapped between the master address and the slave address based on a set reference, and an offset corresponding to the master address is set to more efficiently perform a system operation. To this end, an interface between the master and the slave is provided to support the efficient system operation. In particular, since the address and data access references of the host 102 and the memory 144 are different, a corresponding relationship between the host address and the memory address is generated to map the addresses, and an offset corresponding to the host address is set to more efficiently perform a system operation. To this end, an interface circuit between the host 102 and the memory 144 is provided to support the efficient system operation. Since the interface circuit based on the mapped address and the set offset may utilize only necessary data, the size of the buffer may be reduced. In addition, since only the requested data is written or read, the entire performance of the system may be improved.

Hereinafter, a data processing system and electronic devices which may be constituted with the memory system 110 including the memory device 150 and the controller 130, which are described above by referring to FIGS. 1 to 8, will be described in detail with reference to FIGS. 9 to 16.

FIGS. 9 to 16 are diagrams schematically illustrating application examples of the data processing system of FIGS. 1 to 8 according to various embodiments.

Figure 9:
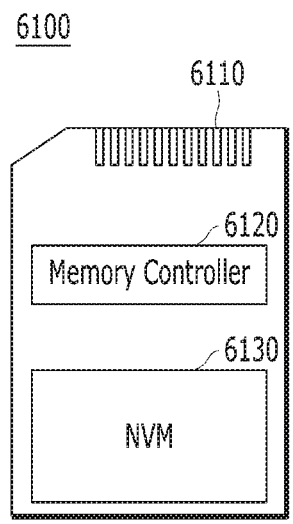
FIGS. 9 to 17 are diagrams schematically illustrating application examples of a data processing system, in accordance with various embodiments of the present invention.

FIG. 9 is a diagram schematically illustrating an example of the data processing system including the memory system in accordance with an embodiment. FIG. 9 schematically illustrates a memory card system including the memory system in accordance with an embodiment.

Referring to FIG. 9, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied by a nonvolatile memory. By the way of example but not limitation, the memory controller 6120 may be configured to control read, write, erase and background operations onto the memory device 6130. The memory controller 6120 may be configured to provide an interface between the memory device 6130 and a host and/or a drive firmware for controlling the memory device 6130. That is, the memory controller 6120 may correspond to the controller 130 in the memory system 110 described with reference to FIGS. 1 to 8, while the memory device 6130 may correspond to the memory device 150 described with reference to FIGS. 1 to 8.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
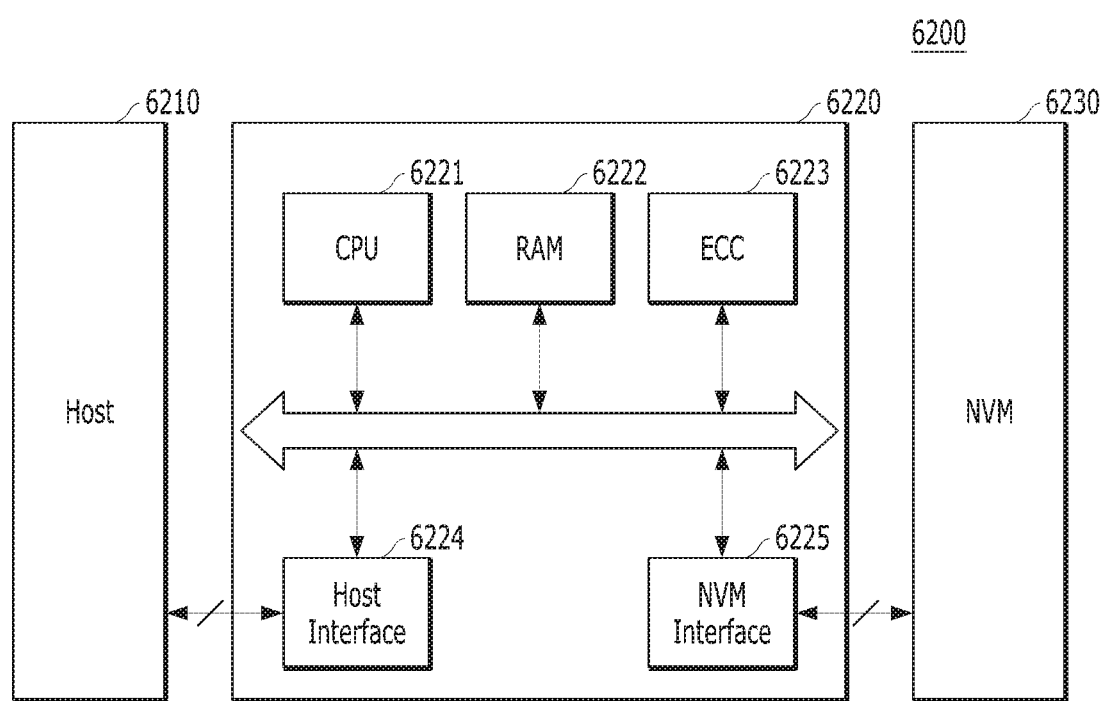

FIG. 10 is a diagram schematically illustrating another example of the data processing system including a memory system, in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 8, and the memory controller 6220 may correspond to the controller 130 in the memory system 110 described in FIGS. 1 to 8.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from, the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long-Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system in accordance with an embodiment may be applied to wired/wireless electronic devices or particularly a mobile electronic device.

Figure 11:
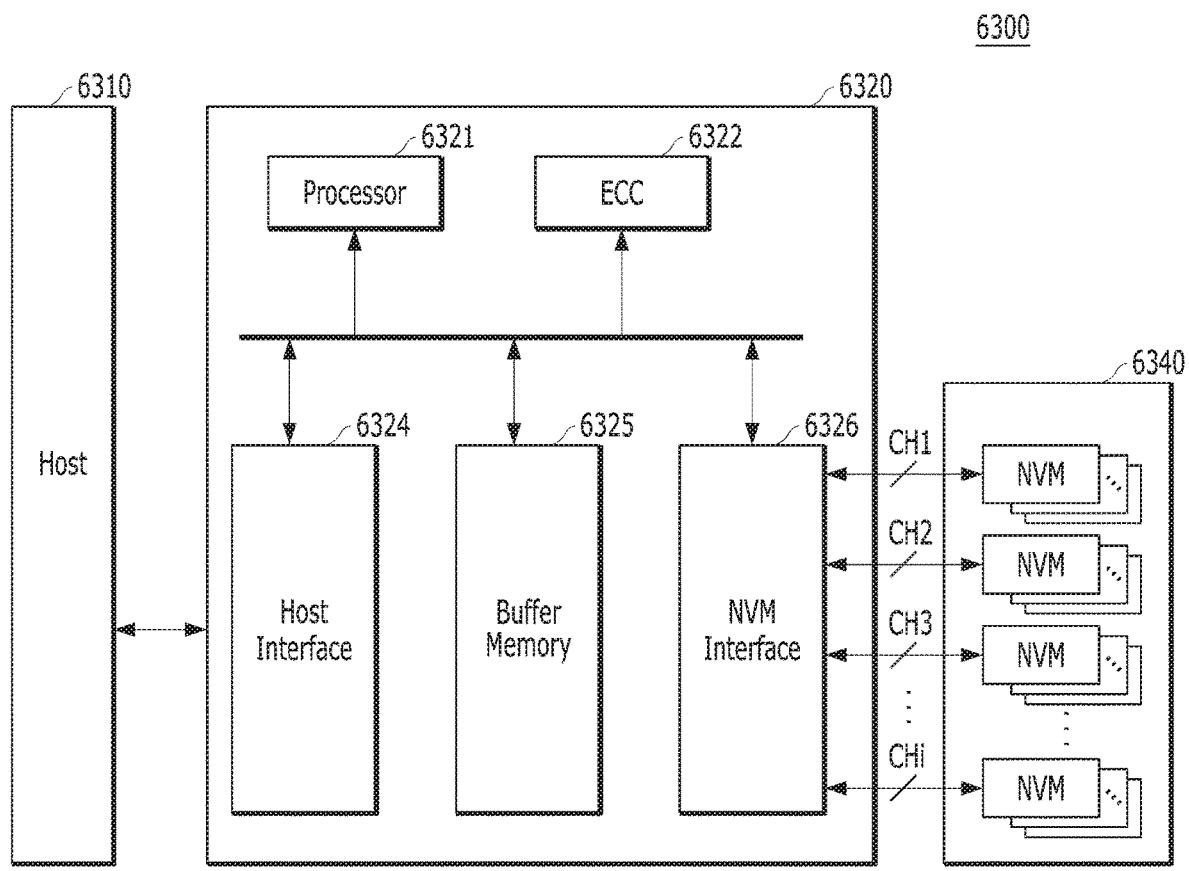

FIG. 11 is a diagram schematically illustrating another example of the data processing system including the memory system in accordance with an embodiment. FIG. 11 schematically illustrates an SSD to which the memory system in accordance with an embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. For the purpose of description, FIG. 11 illustrates that the buffer memory 6325 exists in the controller 6320, but the buffer memory 6325 may be located or arranged outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
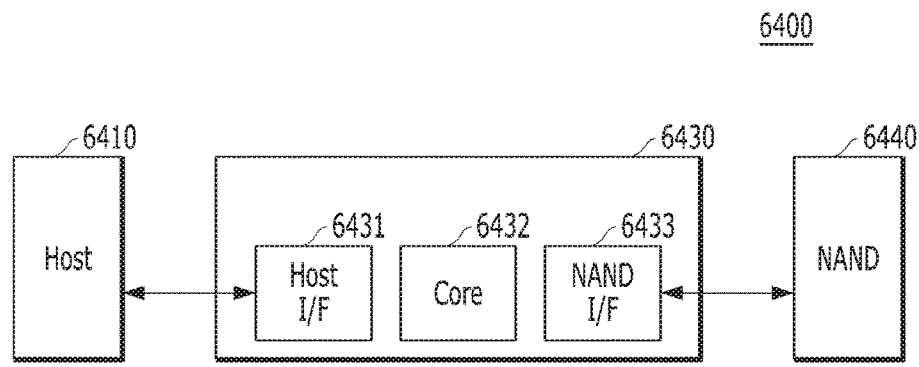
Figure 13:
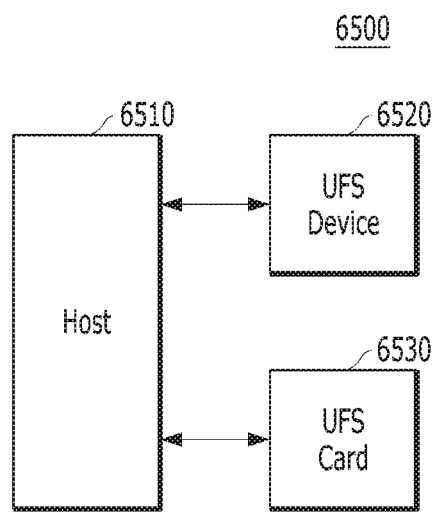
Figure 14:
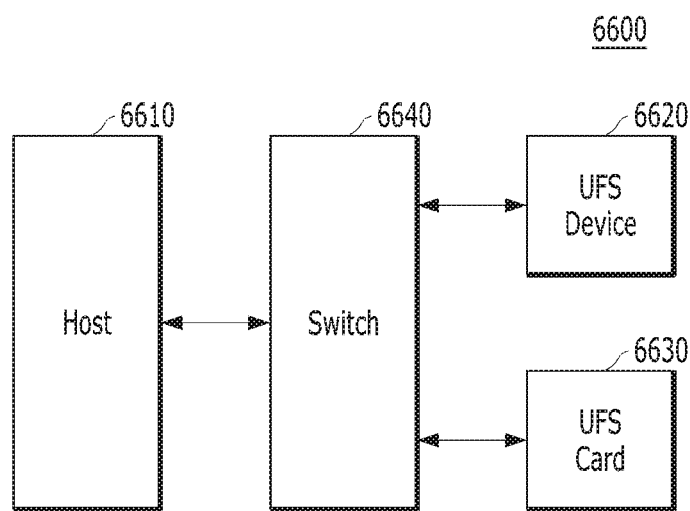
Figure 15:
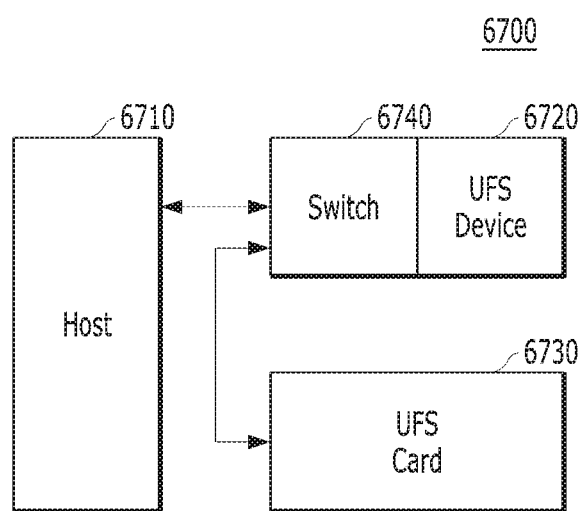
Figure 16:
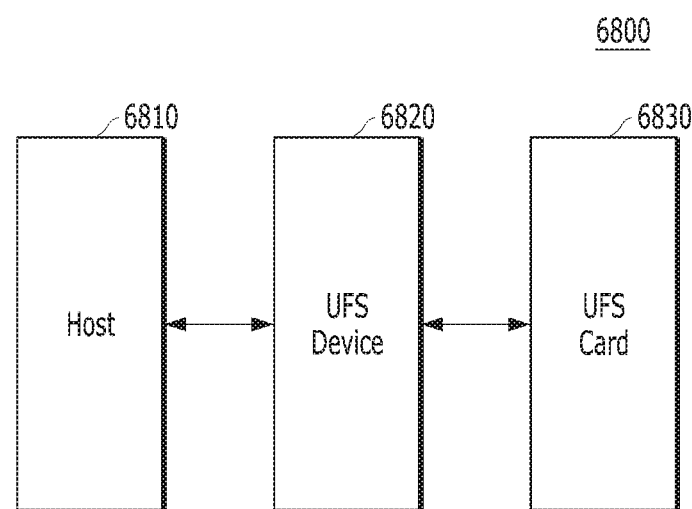

FIG. 12 is a diagram schematically illustrating another example of the data processing system including the memory system in accordance with an embodiment. FIG. 12 schematically illustrates an embedded Multi-Media Card (eMMC) to which the memory system in accordance with an embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with an embodiment. FIGS.

13 to 16 schematically illustrate UFS (Universal Flash Storage) systems to which the memory system in accordance with an embodiment is applied.

Referring to FIGS. 13 to 16, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 17:
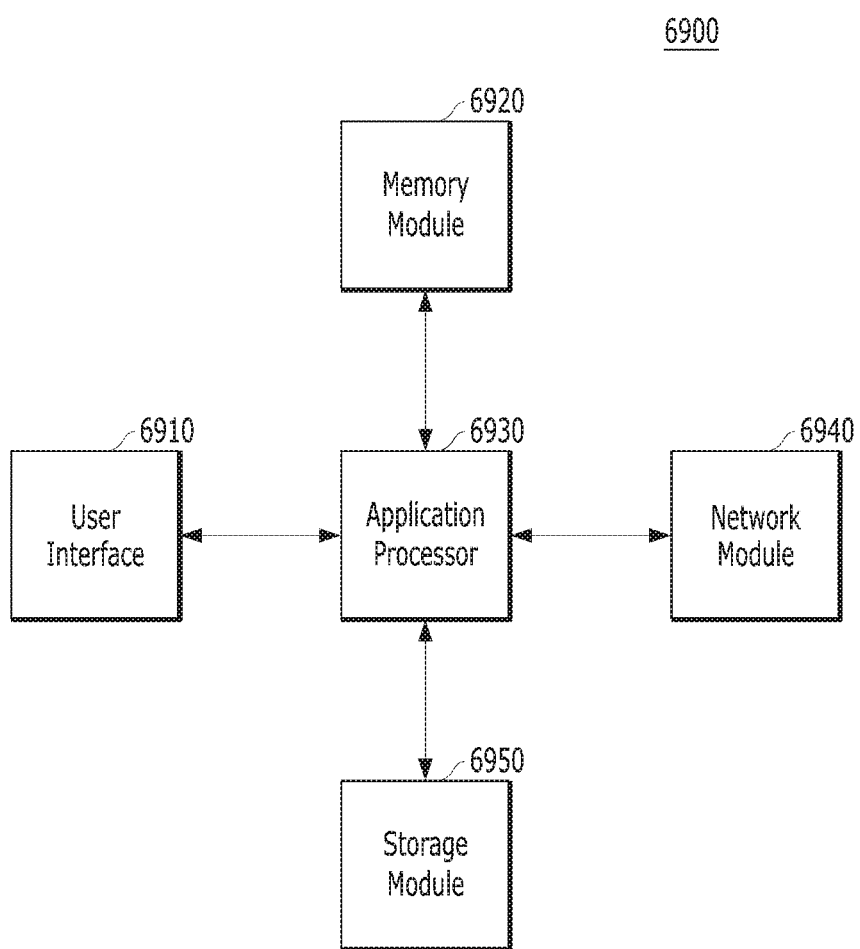

FIG. 17 is a diagram schematically illustrating another example of the data processing system including the memory system in accordance with an embodiment. FIG. 17 is a diagram schematically illustrating a user system to which the memory system in accordance with an embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. An interface circuit, comprising:
   an address mapping unit suitable for mapping a plurality of logical master addresses to a logical slave address by using a shifting operation on the respective logical master addresses;
   an offset setting unit suitable for setting offsets for the respective logical master addresses; and
   a data controller suitable for accessing a slave to process target data corresponding to the respective logical master addresses based on the logical slave address and the offsets.

2. The interface circuit of claim 1, wherein the offset setting unit sets a start offset and an end offset, wherein the start offset is an offset of a first address of the logical master addresses corresponding to the target data, and the end offset is an offset of a last address of the logical master addresses corresponding to the target data.

3. The interface circuit of claim 2, further comprising:
a command order determining unit suitable for determining an order of a plurality of commands corresponding to the target data.

4. The interface circuit of claim 3, wherein the command order determining unit includes:
an address boundary checker suitable for checking a boundary of an address at which only corresponding row is changed; and
a command order controller suitable for determining the order of the plurality of commands based on the boundary of the address.

5. The interface circuit of claim 2, wherein the data controller reads data stored in the slave and outputs the read data to a master based on the mapped addresses and the offsets.

6. The interface circuit of claim 2, wherein the data controller outputs data transferred from a host to the slave based on the mapped addresses and the offsets.

7. The interface circuit of claim 6, wherein the data controller reads candidate data allocated to the logical slave address corresponding to each of the start offset and the end offset, and merges the data outputted from the data controller with the candidate data to output to the slave.

8. The interface circuit of claim 6, wherein the data controller checks whether or not the slave has a data masking function.

9. The interface circuit of claim 8, wherein, when the slave has the data masking function, the data controller outputs the data to be written to the slave based on the data masking function.

10. The interface circuit of claim 6, wherein the data controller checks whether or not the data to be written is aligned data, and outputs the data to the slave based on a result of the checking of the data.

11. A storage device having an interface circuit for interfacing a master to a slave, the interface circuit being suitable for:
mapping a plurality of logical master addresses to a logical slave address;
setting offsets for the respective logical master addresses; and
accessing the slave to process target data corresponding to the respective logical master addresses based on the logical slave address and the offsets.

12. The storage device of claim 11, wherein the mapping includes a shifting operation on the respective logical master addresses.

13. The storage device of claim 11, wherein the master is a host and the slave is a memory.

14. The storage device of claim 11, wherein the interface circuit comprises an address mapping unit, an offset setting unit and a command controller for performing the mapping, the setting and the accessing, respectively.

15. The storage device of claim 14 further comprising a command order determining unit for determining the order of execution of operations relating to the performance of commands received from the master.

16. The storage device of claim 14, wherein the offset setting unit sets a start offset and an end offset, wherein the start offset is an offset of a first address of the logical master addresses corresponding to the target data, and the end offset is an offset of a last address of the logical master addresses corresponding to the target data.

17. The storage device of claim 15, wherein the command order determining unit includes:
an address boundary checker suitable for checking a boundary of an address at which only corresponding row is changed; and
a command order controller suitable for determining the order of the plurality of commands based on the boundary of the address.

18. The storage device of claim 14, wherein the data controller reads data stored in the slave and outputs the read data to a master based on the mapped addresses and the offsets.

19. The storage device of claim 18, wherein the data controller outputs data transferred from a host to the slave based on the mapped addresses and the offsets.

20. The storage device of claim 19, wherein the data controller reads candidate data allocated to the logical slave address corresponding to each of the start offset and the end offset, and merges the data outputted from the data controller with the candidate data to output to the slave.

* * * * *